US010701066B2

(12) United States Patent
Zheng et al.

(10) Patent No.: US 10,701,066 B2
(45) Date of Patent: Jun. 30, 2020

(54) IDENTITY AUTHENTICATION METHOD AND APPARATUS

(71) Applicant: Tencent Technology (Shenzhen) Company Limited, Shenzhen (CN)

(72) Inventors: Lu Zheng, Shenzhen (CN); Shuai Zhang, Shenzhen (CN); Tingting Shang, Shenzhen (CN); Rui Rao, Shenzhen (CN); Yan Chen, Shenzhen (CN); Yaode Huang, Shenzhen (CN); Zhenhua Wang, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 340 days.

(21) Appl. No.: 15/792,432

(22) Filed: Oct. 24, 2017

(65) Prior Publication Data

US 2018/0048641 A1 Feb. 15, 2018

Related U.S. Application Data

(63) Continuation-in-part of application No. PCT/CN2016/087223, filed on Jun. 27, 2016.

(30) Foreign Application Priority Data

Oct. 9, 2015 (CN) .......................... 2015 1 0648168

(51) Int. Cl.
  *H04L 29/06* (2006.01)
  *H04L 9/32* (2006.01)
  *G09C 5/00* (2006.01)

(52) U.S. Cl.
  CPC ............ *H04L 63/0846* (2013.01); *G09C 5/00* (2013.01); *H04L 9/3226* (2013.01); *H04L 63/068* (2013.01); *H04L 63/0861* (2013.01)

(58) Field of Classification Search
  CPC . H04L 63/068; H04L 63/0846; H04L 9/3226; H04L 63/0861; H04L 63/0838;
  (Continued)

(56) References Cited

U.S. PATENT DOCUMENTS

2007/0036289 A1* 2/2007 Fu ...................... G07C 9/00158
                                                                  379/88.02
2008/0130956 A1    6/2008 Jordan et al.
(Continued)

FOREIGN PATENT DOCUMENTS

CN          101441869 A         5/2009
CN          102916815 A         2/2013
(Continued)

OTHER PUBLICATIONS

Tencent Techology, ISRWO, PCT/CN2016/087223, Sep. 18, 2016, 8 pgs.

(Continued)

*Primary Examiner* — Amir Mehrmanesh
(74) *Attorney, Agent, or Firm* — Morgan, Lewis & Bockius LLP

(57) ABSTRACT

An identity authentication method, comprising: at an electronic device having one or more processors and memory, the electronic device coupled with a display and one or more input devices: receiving an identity authentication request; in response to receiving the identity authentication request, performing an interactive authentication information exchange between the electronic device and a user, including: displaying, on the display, first visual information in a first manner; displaying, on the display, the first visual information in a second manner that is distinct from the first manner, wherein the first visual information displayed in the second manner includes a timing characteristic that is absent from the first visual information displayed in the first
(Continued)

manner; receiving user input entered in accordance with the first visual information displayed in the second manner; and verifying that the user input conforms to the timing characteristic in the first visual information displayed in the second manner.

17 Claims, 9 Drawing Sheets

(58) Field of Classification Search
CPC ......... H04L 63/08; H04L 9/32; H04L 63/083; G09C 5/00; G06F 21/43; G06F 21/31
See application file for complete search history.

(56) References Cited

U.S. PATENT DOCUMENTS

2011/0047607 A1* 2/2011 Chen ...................... G06F 21/43
726/7

2016/0179554 A1* 6/2016 Khosravi .............. G06F 9/4406
726/1
2016/0294837 A1* 10/2016 Turgeman ............. H04L 63/102

FOREIGN PATENT DOCUMENTS

| | | |
|---|---|---|
| CN | 103326989 A | 9/2013 |
| CN | 103986725 A | 8/2014 |
| CN | 104219195 A | 12/2014 |
| CN | 104376250 A | 2/2015 |
| EP | 2284802 A1 | 2/2011 |

OTHER PUBLICATIONS

Tencent Techology, IPRP, PCT/CN2016/087223, Apr. 10, 2018, 7 pgs.

* cited by examiner

IDENTITY AUTHENTICATION METHOD AND APPARATUS

RELATED APPLICATIONS

This application is a continuation-in-part application of PCT/CN2016/087223, entitled "IDENTITY AUTHENTICATION METHOD AND APPARATUS" filed on Jun. 27, 2016, which claims priority to Chinese Patent Application No. 201510648168.8, filed with the State Intellectual Property Office of the People's Republic of China on Oct. 9, 2015, and entitled "IDENTITY AUTHENTICATION METHOD AND APPARATUS", both of which are incorporated herein by reference in their entirety.

FIELD OF THE TECHNOLOGY

The present disclosure relates to the field of communications technologies, and in particular, to an identity authentication method and apparatus.

BACKGROUND OF THE DISCLOSURE

With continuous development of Internet technologies, convenience brought by the Internet to people's life is accompanied with a severe network security situation. It is often seen that a user's bank account is stolen, funds are embezzled, a user's identity is fraudulently used, and the like.

Currently, a common identity authentication technology is static authentication, for example, a form of "a user's account+a static password" is used. However, the user's account and the static password have risks of being leaked and stolen, causing a relatively large potential security risk during an identity authentication process.

SUMMARY

The present disclosure provides an identity authentication method and apparatus, so as to improve security and convenience of identity authentication.

To resolve the foregoing technical problem, an embodiment of the present disclosure provides the following technical solution:

An identity authentication method is provided, including:
receiving an identity authentication request;
determining a first preset area and a second preset area on a display interface;
displaying a verification code in the first preset area according to the identity authentication request;
highlighting, one by one in the second preset area, verification code characters on which voice identification needs to be currently performed and that are in the verification code;
receiving voice information entered by a user according to the highlighted verification code character; and
uploading the voice information to a server, so that the server performs identity authentication on the user according to the voice information.

To resolve the foregoing technical problem, an embodiment of the present disclosure further provides the following technical solution:

An identity authentication apparatus is provided, including:
a memory;
one or more processors; and
one or more instruction units that are stored in the memory and executed by the one or more processors, and the instruction units including: a first receiving unit, a first display unit, a second display unit, a second receiving unit, and an uploading unit,
the first receiving unit being configured to receive an identity authentication request;
the first display unit being configured to: determine a first preset area and a second preset area on a display interface, and display a verification code in the first preset area according to the identity authentication request;
the second display unit being configured to highlight, one by one in the second preset area, verification code characters on which voice identification needs to be currently performed and that are in the verification code;
the second receiving unit being configured to receive voice information entered by a user according to the highlighted verification code character; and
the uploading unit being configured to upload the voice information to a server, so that the server performs identity authentication on the user according to the voice information.

In addition, an embodiment of the present disclosure further provides the following technical solution:

A machine readable medium, storing instructions causing a machine to perform the following operations:
receiving an identity authentication request;
determining a first preset area and a second preset area on a display interface;
displaying a verification code in the first preset area according to the identity authentication request;
highlighting, one by one in the second preset area, verification code characters on which voice identification needs to be currently performed and that are in the verification code;
receiving voice information entered by a user according to the highlighted verification code character; and
uploading the voice information to a server, so that the server performs identity authentication on the user according to the voice information.

BRIEF DESCRIPTION OF THE DRAWINGS

The following describes, in detail with reference to the accompany drawings, specific implementation manners of the present disclosure, causing the technical solutions of the present disclosure and other beneficial effects obvious.

DESCRIPTION OF EMBODIMENTS

Figure 1A:
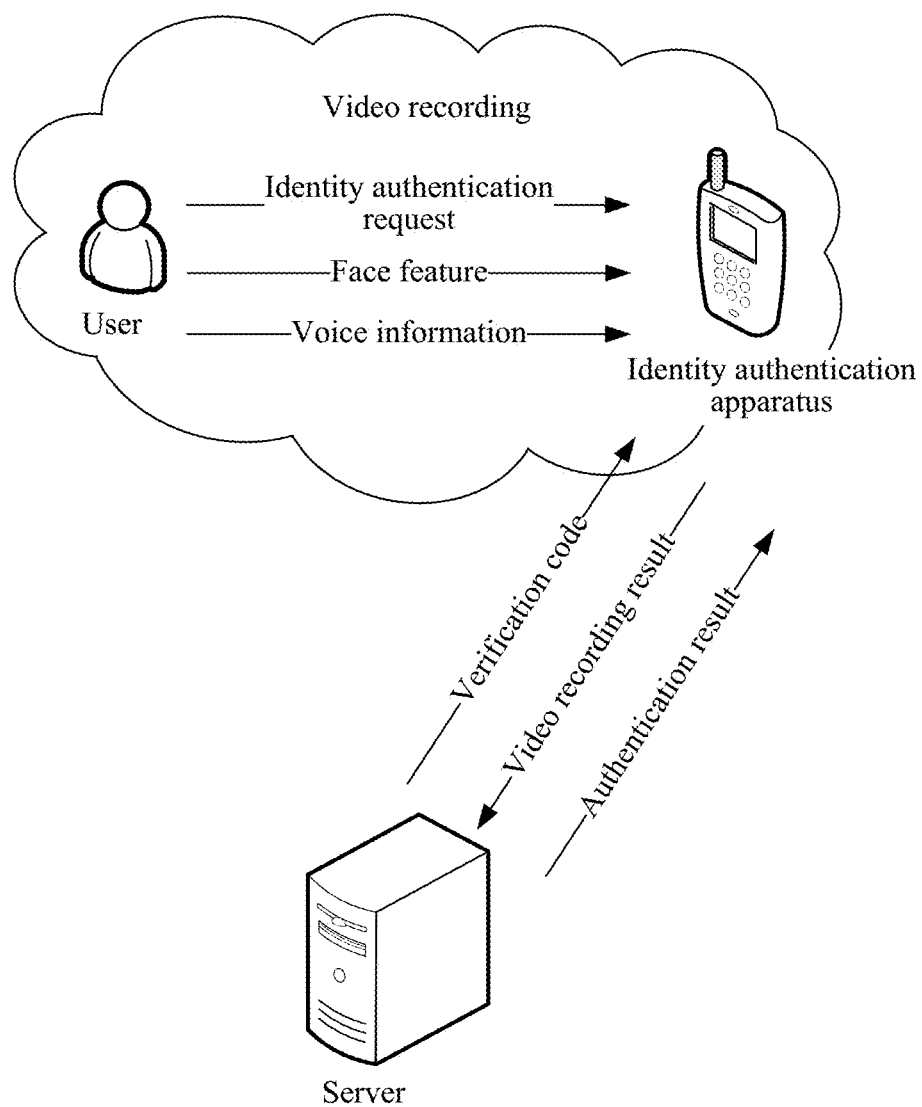
FIG. 1a is a schematic scenario diagram of an identity authentication system according to some embodiments of the present disclosure.

Referring to the drawings, same component symbols represent same components. A principle of the present disclosure is described by using examples in which the present disclosure is implemented in proper computing environments. The following descriptions are specific embodiments of the present disclosure based on the examples, and should not be construed as a limitation to other specific embodiments of the present disclosure that are not described herein in detail.

In the description below, the specific embodiments of the present disclosure will be described with reference to operations and signs of operations that are performed by one or more computers, unless indicated otherwise. Therefore, such operations and operations are at times referred to as being computer-executed, and include the manipulation by a processing unit of the computer of electrical signals representing data in a structured form. This manipulation transforms the data or maintains it at locations in a memory system of the computer, which reconfigures or otherwise alters the operation of the computer in a manner well understood by those skilled in the art. The data structures where data is maintained are physical locations of the memory that have particular properties defined by the format of the data. However, while the principle of the present disclosure is being described in the foregoing context, it is not meant to be limiting as those of skill in the art will appreciate that various of the operations and operations described hereinafter may also be implemented in hardware.

A term "unit" used in the specification may be considered as a software object executed in the computing system. Different components, modules, engines, and services described in the specification may be considered as objects implemented in the computing system. The apparatus and method described in the specification are preferably implemented in a form of software, and certainly may also be implemented in a form of hardware, both of which fall within the protection scope of the present disclosure.

In the existing technology of using "a user's account+a static password", when an unauthorized user obtains a user's account and a static password, the existing technology cannot effectively distinguish the authorized user from the unauthorized user. In addition, during authentication, a user needs to manually enter an account and a password, and if the user forgets the account and the password, or if the user cannot see an operation instruction clearly, the authentication fails. Therefore, the existing identity authentication technology has multiple potential security risks, and brings some operation and usage inconvenience to the user.

To resolve the foregoing problem, embodiments of the present disclosure provide an identity authentication method and apparatus.

Referring to FIG. 1a, FIG. 1a is a schematic scenario diagram of an identity authentication system according to some embodiments of the present disclosure. The identity authentication system may include an identity authentication apparatus and a server. The identity authentication apparatus may be specifically integrated into a terminal machine, such as a notebook computer, a tablet personal computer (PC), and a mobile phone, that has a storage unit and has a computing capability due to an installed microprocessor. The identity authentication apparatus is mainly configured to receive an identity authentication request initiated by a user. After receiving the identity authentication request of the user, prompting the user to record a video, obtaining face features, and performing voice identification, which specifically includes: displaying a verification code in a first preset area; highlighting, one by one in a second preset area, verification code characters on which voice identification needs to be currently performed and that are in the verification code, so that the user can read according to the highlighted verification code character, and finally, uploading a video recording result the server, so that the server performs identity authentication on the user according to the video recording result.

In addition, the identity authentication system may further include the server, which is mainly configured to: generate a verification code and send the verification code to the identity authentication apparatus, receive the video recording result uploaded by the identity authentication apparatus, and perform the identity authentication on the user according to the video recording result. As shown in FIG. 1a, a user performs identity authentication by using a mobile phone. The user in the system is merely for ease of description, and does not belong to a part constituting the system. For example, face feature collection is implemented by recording a video for the user. During the recording, verification code characters are highlighted one by one, so that the user is guided to read the highlighted verification code characters in a highlighted verification code character display rhythm. Therefore, voice information is collected, and a video recording result is uploaded to the server. The server may prestore identification card information of the user, and then implements personal identity authentication by means of face identification, voice identification, and identification card information comparison in combination with a face authentication process, and the server feeds back an authentication result to the mobile phone, thereby improving security of the identity authentication, and the like.

Detailed descriptions are separately provided below.

In an embodiment, a description is made from the perspective of an identity authentication apparatus. The identity authentication apparatus may be specifically integrated into a terminal device such as a notebook computer, or a tablet PC, or a mobile phone.

An identity authentication method is provided, including: receiving an identity authentication request; displaying a verification code in a first preset area according to the identity authentication request; highlighting, one by one in a second preset area, verification code characters on which voice identification needs to be currently performed and that are in the verification code; receiving voice information entered by a user according to the highlighted verification code character; and uploading the voice information to a server, so that the server performs identity authentication on the user according to the voice information.

Figure 1B:
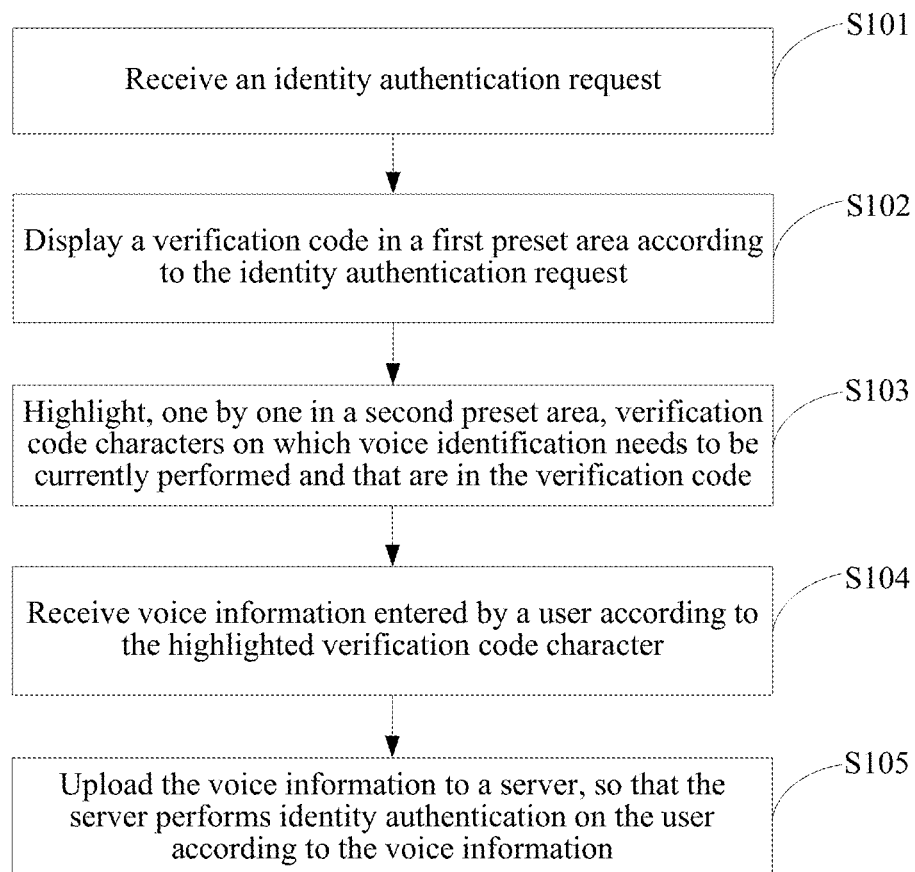
FIG. 1b is a schematic flowchart of an identity authentication method according to some embodiments of the present disclosure.

Referring to FIG. 1b, FIG. 1b is a schematic flowchart of an identity authentication method according to some embodiments of the present disclosure. The method includes the following operations:

Operation S101: Receive an identity authentication request.

Operation S102: Display a verification code in a first preset area according to the identity authentication request.

Operation S101 and operation S102 may be specifically:

Preferably, the "displaying a verification code in a first preset area according to the identity authentication request" may be specifically:

Operation a: Instruct, according to the identity authentication request, to enter a voice identification mode.

Operation b: Obtain the verification code after determining that the voice identification mode is entered.

For example, a prompt key prompting a user to enter the voice identification mode is displayed on a screen of a terminal. If the user clicks the prompt key, it is determined that the voice identification mode is entered. A server randomly generates a verification code and delivers the verification code to the terminal. The verification code includes multiple verification code characters, which may be specifically digits, letters, a text, or the like, and is not specifically limited herein.

Operation c: Display the verification code in a first style in the first preset area, to indicate that the verification code is not yet read by the user (e.g., corresponding voice input not yet received or recorded).

In this operation, the first preset area and a second preset area on a display interface are determined. For example, the first preset area may be on an upper portion of the screen of the terminal. After the verification code delivered by the server is obtained, the verification code is displayed in the first style on the upper portion of the screen of the terminal. The first style may specifically limit a font size and/or a font color of the verification code. For example, gray processing is performed on the verification code, to indicate that the verification code is not yet read by the user (e.g., corresponding voice input not yet received or recorded).

More preferably, before the "instructing, according to the identity authentication request, to enter a voice identification mode" (that is, operation a), the method may further include:

entering a face authentication mode according to the identity authentication request; and displaying a preset face authentication area in the face authentication mode, to prompt the user to align the face to the preset face authentication area; collecting face features, and obtaining a face feature collection result.

Specifically, for example, when an identity authentication request is received, a camera of the terminal is started, and a face authentication mode is directly entered. In the face authentication mode, a preset face authentication area is displayed, the preset face authentication area being used to prompt a user to align the face to the face authentication area, and face features are collected. In addition, an option that instructs to enter a voice identification mode is output on the screen of the terminal. For example, a prompt key prompting the user to enter the voice identification mode is displayed. Then, an operation performed by the user on the option is received, so that it is determined that the voice identification mode is entered. For example, if the user clicks the prompt key, the voice identification mode is entered, that is, a video is started to be recorded when the identity authentication request is received, so as to implement face feature collection and voice recording.

Operation S103: Highlight, one by one in a second preset area, verification code characters on which voice identification needs to be currently performed and that are in the verification code.

For example, the second preset area may be the center of the screen of the terminal. After the voice identification mode is entered, the verification code characters on which voice identification needs to be currently performed and that are in the verification code are highlighted one by one at the center of the screen of the terminal. The highlighting means that adjustment is performed on the font style of the verification code character according to a preset font style, which may specifically limit a font size and/or a font color of the verification code character, so that the verification code character is highlighted and is convenient for the user to view.

It may be understood that there are multiple manners of the "highlighting one by one, verification code characters on which voice identification needs to be currently performed and that are in the verification code". Preferably, the manner may be specifically as follows:

Operation 1: Determine, according to an arrangement order of verification code characters, the verification code character on which voice identification needs to be currently performed.

For example, if the verification code is "54632", a verification code character on which voice identification needs to be currently performed is determined and highlighted in an order of "5→4→6→3→2".

Operation 2: Enlarge, according to a preset font size, the font size of the verification code character on which voice identification needs to be currently performed.

Operation 3: Display the enlarged verification code character at the center of the screen within a preset time interval, and trigger enlarged display of a next verification code character according to the arrangement order of the verification code characters.

For example, if the font size of the verification code displayed in the first preset area is four, the font size of the verification code character on which voice identification needs to be currently performed may be set to one, initial, or the like, that is, the original verification code character is enlarged, and the enlarged verification code character is displayed at the center of the screen within the preset time interval. For example, each verification code character is displayed at the center of the screen for 2 seconds or 3 seconds, so that the user can view the verification code character clearly and has enough time to read.

It may be understood that after a verification code character is enlarged displayed, enlarged display of a next verification code character is triggered according to the arrangement order of the verification code. For example, if the verification code is "54632", and after a verification code character "4" is enlarged displayed currently, enlarged display of a verification code character "6" is triggered in an order of "5→4→6→3→2" and is implemented according to the foregoing operation 2 and operation 3.

Further, the "displaying the enlarged verification code character at the center of the screen within a preset time interval" (that is, operation 3) may further include the following operations:

determining, in the verification code displayed in the first preset area, the enlarged displayed verification code character; and displaying, in a second style, the enlarged displayed verification code character, to indicate that the verification code character is read.

That is, after the verification code character is enlarged displayed at the center of the screen, in the entire verification code displayed in the first preset area (for example, on the upper portion of the screen), the enlarged displayed verification code character is displayed in the second style. The second style may specifically limit a font size and/or a font color of the verification code. If the verification code is displayed in a default format, that is, displayed in a black color, it indicates that the verification code character is read, which is different from the gray-processed unread verification code character.

Operation S104: Receive voice information entered by a user according to the highlighted verification code character.

Operation S105: Upload the voice information to a server, so that the server performs identity authentication on the user according to the voice information.

Operation S104 and operation S105 may be specifically:

It may be understood that the voice information sent by the user according to the enlarged verification code character is received during the displaying the enlarged verification code character at the center of the screen within a preset time interval.

For example, the verification code is "54632", if a verification code character "4" is enlarged displayed currently at the center of the screen, the user reads the current verification code character "4", and the voice information is received by means of a voice recording function. Then, a next verification code character "6" is enlarged displayed, the user reads the verification code character "6", and the voice information is received by means of the voice recording function. The rest can be deduced by analogy, and voice information entered by the user according to a current highlighted verification code character is received.

Preferably, after the receiving voice information and before the uploading the voice information to a server, so that the server performs identity authentication on the user according to the voice information, the method may further include the following operations:

exiting the face authentication mode and the voice identification mode after determining that all the verification code characters are enlarged displayed; and receiving a selection instruction of the user, where the selection instruction instructs to upload a video recording result or record a video again for the video recording result, and the video recording result includes the received voice information and a face feature collection result.

That is, after all the verification code characters are enlarged displayed, a video recording mode may be exited, that is, the face authentication mode and the voice identification mode are exited. After the video recording mode is exited, the terminal prompts the user to upload the video recording result or record a video again for the video recording result. The user makes a selection according to the prompt, and the terminal makes a response according to the selection of the user. The video recording result may include the received voice information and the face feature collection result during the video recording.

Further, when determining, according to the selection instruction, that the selection instruction of the user instructs to upload the video recording result, the terminal uploads the video recording result to the server, so that the server performs the identity authentication according to the video recording result.

In a more preferred manner, preset personal information may further be uploaded for the authentication, such as identification card information or service password information, thereby improving security. This is not specifically limited herein.

It may be learned from the foregoing that, according to the identity authentication method provided in this embodiment, when an identity authentication request is received, a verification code is displayed in a first preset area, to instruct a user that voice identification needs to be performed. Verification code characters on which voice identification needs to be currently performed and that are in the verification code are highlighted one by one in a second preset area, so that it is convenient for the user read the highlighted verification code character, and finally, voice information is uploaded to a server, so that the server performs identity authentication on the user according to the voice information. In this embodiment of the present disclosure, voice authentication is added to an identity authentication process, and voice information on which authentication needs to be performed is collected by reading the verification code by the user, thereby avoiding risks of password leakage and stolen. In addition, during the voice information collection, the verification code characters on which voice identification needs to be currently performed are highlighted one by one in the preset area, so that it is more convenient for the user to distinguish. Compared with an existing manner of a user password and a static password, this embodiment greatly improves security and convenience of identity authentication.

According to the method described in the foregoing embodiment, a detailed description is further made below with an example.

Figure 2A:
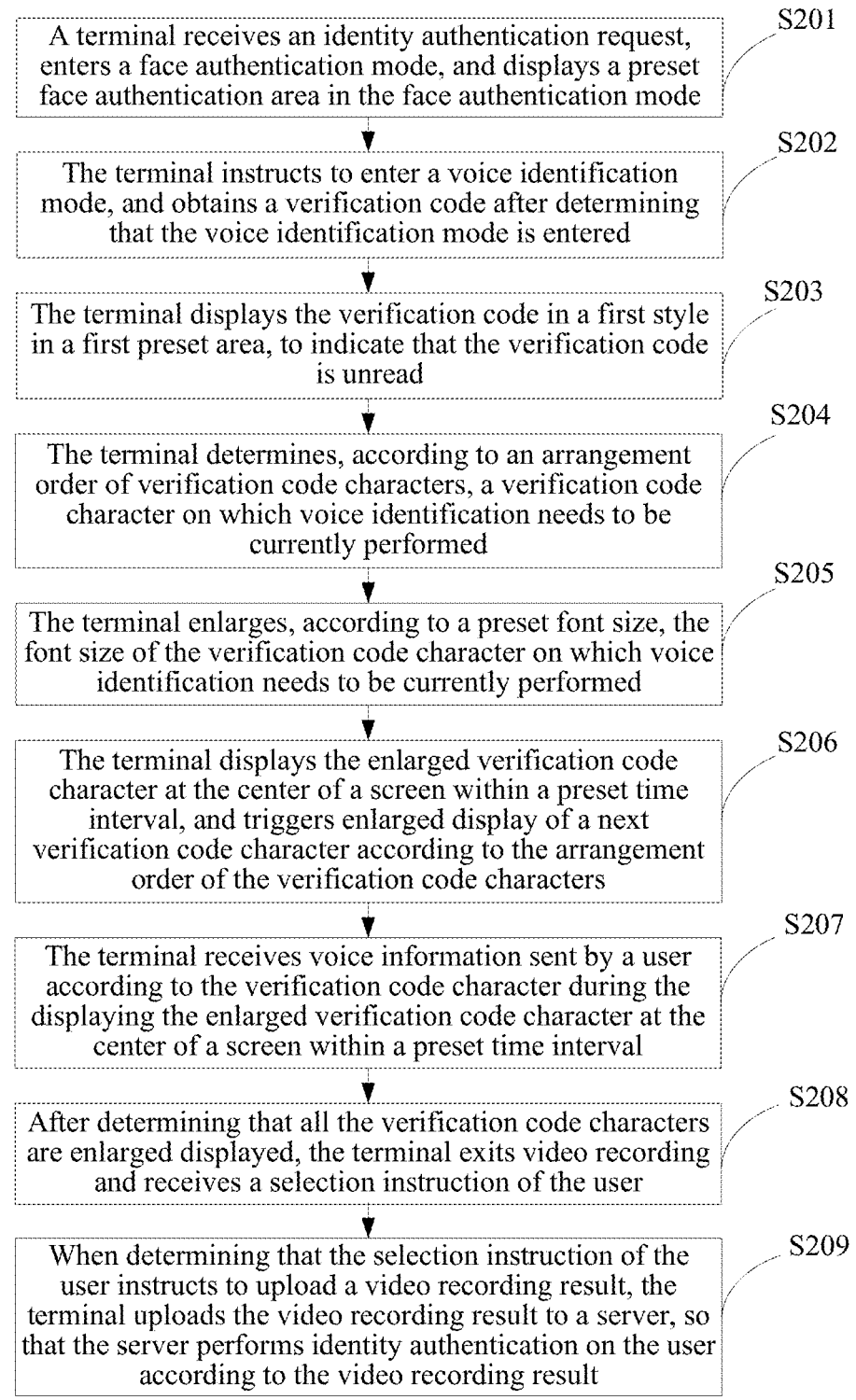
FIG. 2a is a schematic flowchart of an identity authentication method according to some embodiments of the present disclosure.

Referring to FIG. 2a, FIG. 2a is a schematic flowchart of an identity authentication method according to some embodiments of the present disclosure. The method includes the following operations:

Operation S201: A terminal receives an identity authentication request, enters a face authentication mode, and displays a preset face authentication area in the face authentication mode.

Operation S202: The terminal instructs to enter a voice identification mode, and obtains a verification code after determining that the voice identification mode is entered.

Figure 2B:
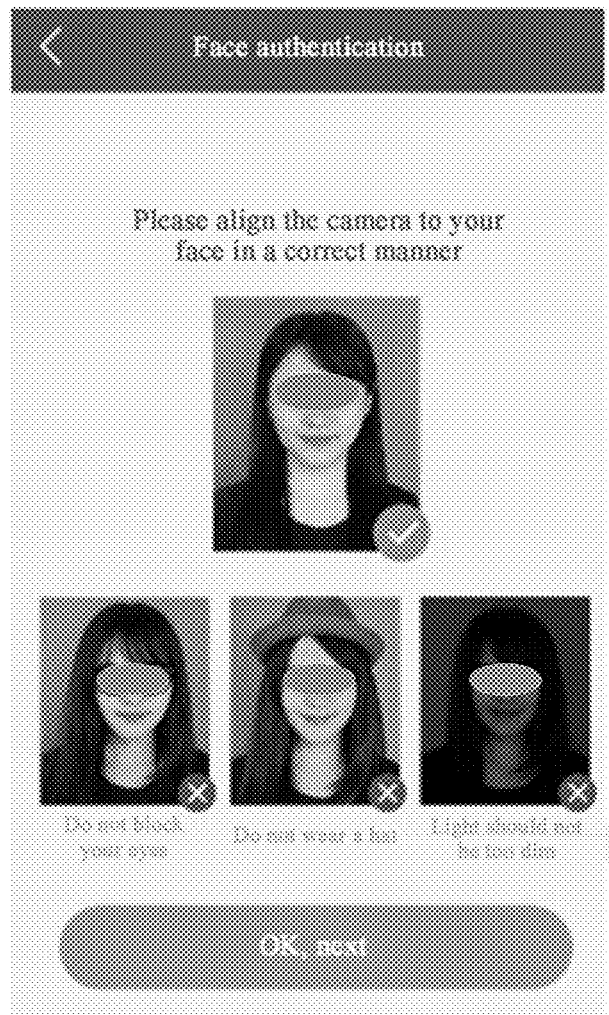
FIG. 2b to FIG. 2f are a schematic diagram of a terminal-side user interface of a scenario of an identity authentication method according to some embodiments of the present disclosure.

Operation S201 and operation S202 may be specifically:

Specifically, for example, if a user opens a wealth management application (APP), when bank card binding and/or fund transferring is performed, a face authentication mode is triggered to enter, and prompt information indicating that the face authentication mode is entered is output, so that identity authentication is performed. In this case, a terminal-side user interface is redirected to a face authentication page. As shown in FIG. 2b, it is displayed on an upper end of a screen of the terminal that the face authentication mode is currently in, operation prompt information "Please align the camera to your face in a correct manner" is displayed to the user, and correct and wrong face authentication images and texts are further displayed at the same time for the user to perform comparison.

Figure 2C:
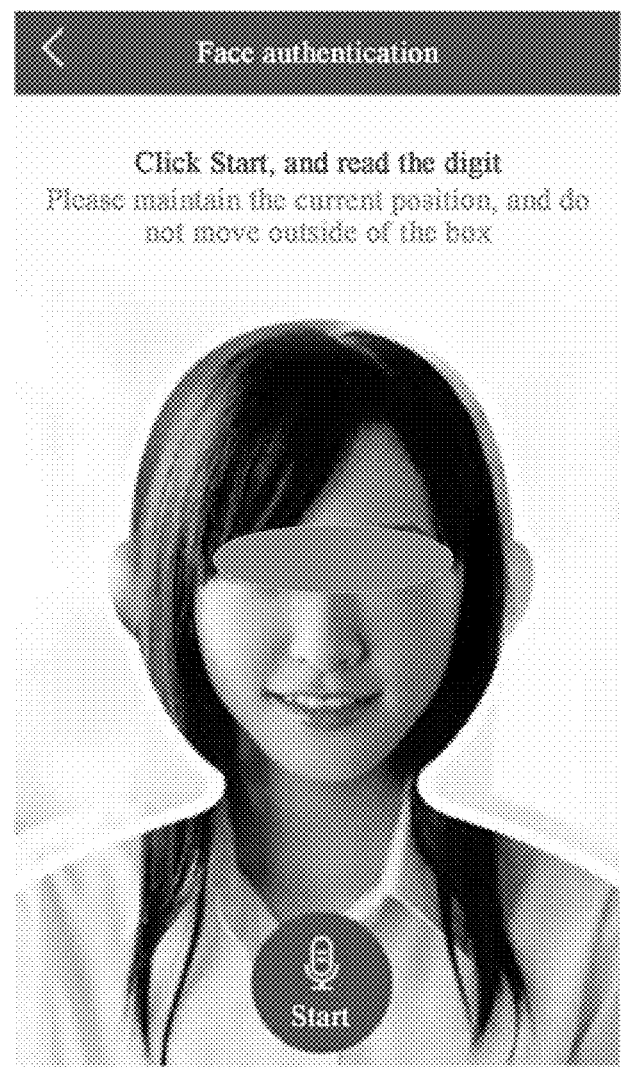

Further, as shown in FIG. 2b, when the user learns content displayed on the page, the user may select to click a prompt key "OK, next" to enter a next operation. As shown in FIG. 2c, the preset face authentication area is displayed in the face authentication mode. That is, after the user clicks the prompt key, the terminal starts to perform video recording for the user, prompts the user to align the face to the preset face authentication area to perform face feature collection, to obtain a face feature collection result, and outputs an option that instructs to enter the voice identification mode.

For example, after the user clicks the prompt key "OK, next" in FIG. 2b, in FIG. 2c, a front camera of the terminal (such as a mobile phone) may be adjusted, and the terminal displays text prompt information "Please maintain the current position, and do not move outside of the box" on the screen, so as to obtain face features. In addition, an operation prompt indicating that the voice identification mode is entered is displayed on the terminal-side user interface. For example, the operation prompt is text prompt information "Click Start, and read the digit", and a key "Start" and a microphone icon are displayed on a lower portion of the terminal-side user interface. If the key "Start" is clicked, it may be determined that the voice identification mode is entered currently. That is, the current video recording is to obtain the face features and voice information of the user.

Operation S203: The terminal displays the verification code in a first style in a first preset area, to indicate that the verification code is not yet read by the user (e.g., corresponding voice input not yet received or recorded).

Operation S204: The terminal determines, according to an arrangement order of multiple verification code characters in the verification code, a verification code character on which voice identification needs to be currently performed.

Operation S205: The terminal enlarges, according to a preset font size, the font size of the verification code character on which voice identification needs to be currently performed.

Operation S206: The terminal displays the enlarged verification code character at the center of a screen within a preset time interval, and triggers enlarged display of a next verification code character according to the arrangement order of the verification code characters.

Operation S207: The terminal receives voice information sent by a user according to the verification code character during the displaying the enlarged verification code character at the center of a screen within a preset time interval.

Operation S203 and operation S207 may be specifically:

In a process that the terminal performs the video recording, obtains the face features, and obtains the voice information of the user, a phase in which authentication digits are enlarged one by one is added to the process of recording the authentication video of the user, and the user is enabled to read the single enlarged digit, thereby succeeding in authentication. First, a server randomly generates a verification code and delivers the verification code to the terminal. In this embodiment, the verification code may be specifically letters, digits, a text, or the like.

Preferably, the first preset area may be an upper portion of the screen of the terminal. After the verification code delivered by the server is obtained, the verification code is displayed in the first style on the upper portion of the screen of the terminal. The first style may specifically limit a font size and/or a font color of the verification code. For example, gray processing is performed on the verification code, to indicate that the verification code is not yet read by the user (e.g., corresponding voice input not yet received or recorded).

In addition, after the voice identification mode is entered, the verification code characters on which voice identification needs to be currently performed and that are in the verification code are highlighted one by one at the center of the screen of the terminal. The highlighting may specifically limit a font size and/or a font color of the verification code character, so that the verification code character is highlighted and is convenient for the user to view.

Figure 2D:
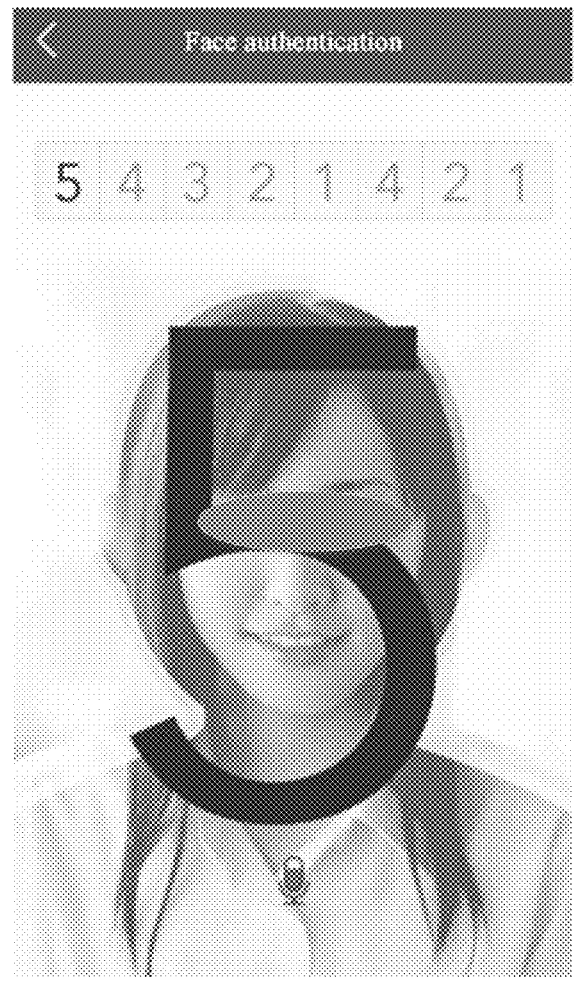

For example, as shown in FIG. 2d, eight random digits are displayed on the top of the screen of the terminal, that is, the verification code is "54321421", and not yet read by the user (e.g., corresponding voice input not yet received or recorded) digits are gray. A digit that the user needs to read currently is enlarged at the center of the screen of the terminal, and stays for 1 or 2 seconds. If the digit that the user needs to read currently is "5", the digit is enlarged at the center of the screen according to a preset font size and stays for 1 or 2 seconds. Within the time interval, the user may view the enlarged verification code character clearly and has enough time to read.

It may be understood that after a verification code character is enlarged displayed, enlarged display of a next verification code character is triggered according to the arrangement order of the verification code. For example, if the verification code is "54321421", and after a verification code character "5" is enlarged displayed currently, enlarged display of a verification code character "4" is triggered in an order of "5→4→3→2→1→4→2→1" and is implemented according to the foregoing operation 204 and operation 205, so that it is convenient for the user to read the enlarged verification code character, and inputs voice information to the terminal.

More preferably, in a process that the user reads the digit, the user needs to maintain the face in a face authentication area, so that feature data is more accurate. In addition, during the displaying the enlarged verification code character at the center of the screen within a preset time interval (that is, operation S206), the style of the verification code displayed in the first preset area may further be changed.

For example, in the verification code displayed in the first preset area, the highlighted verification code character is determined; and the highlighted verification code character is displayed in a second style, to indicate that the verification code character is read.

As shown in FIG. 2d, when the verification code character "5" is enlarged displayed at the center of the screen, in the entire verification code "54321421" displayed in the first preset area (on the upper portion of the screen), the enlarged displayed verification code character "5" is displayed in the second style. The second style may specifically limit a font size and/or a font color of the verification code. If the verification code is displayed in a default format, that is, displayed in a black color, it indicates that the verification code character is read, which is different from the gray-processed unread verification code character.

It is easily conceived that there are multiple manners of highlighting one by one, the verification code characters on which voice identification needs to be currently performed and that are in the verification code, except the manner of enlarged displaying the verification code character at the center in this embodiment, the verification code character on which voice identification needs to be currently performed may alternatively be blinking displayed at the center of the screen, or the color of verification code character on which voice identification needs to be currently performed may be changed, so that it is easier for a user to view and read the verification code. The examples herein do not constitute limitations to the present disclosure.

Operation S208: After determining that all verification code characters are enlarged displayed, the terminal exits video recording and receives a selection instruction of the user.

Operation S209: When determining that the selection instruction of the user instructs to upload a video recording result, the terminal uploads the video recording result to a server, so that the server performs identity authentication on the user according to the video recording result.

Operation S208 and operation S209 may be specifically:

It may be understood that after it is determined that all the verification code characters are enlarged displayed, that is, the user completes reading, the video recording is stopped and the face authentication mode and the voice identification mode are automatically exited. In this case, a selection may be made, according to the instruction of the user, to upload the video recording result or record a video again for the video recording result. The video recording result includes received voice information and a face feature collection result.

Figure 2E:

For example, as shown in FIG. 2e, after eight digital verification code characters are read, the video recording is stopped, and control keys "Try again" and "Start authentication" are displayed on a lower portion of the screen, the user may select to upload the video or record a video again.

Figure 2F:
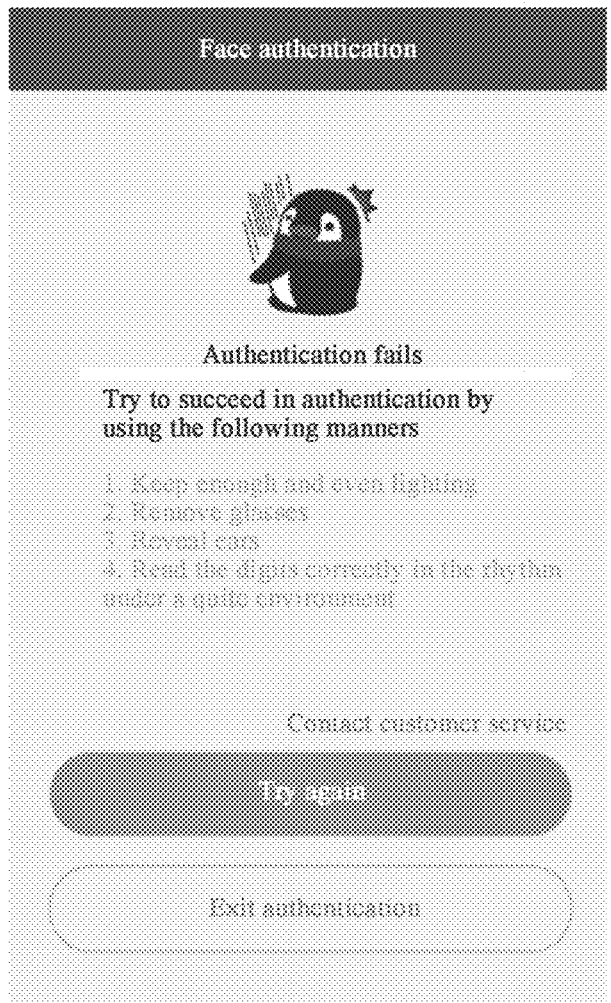

After the video recording result (the video) is uploaded, the server extracts the face features of the user and compares the face features with an identification card photo prestored in the server, and authenticates a verification code indicated by the voice information. If the face and voice authentication succeed, a next operation is automatically proceeded to, so as to perform the bank card binding or fund transferring operation. If the face and voice authentication fail, an authentication failure page is displayed, as shown in FIG. 2f, and the user may select to record a video again or contact the customer service or exit the authentication. In some embodiments, tips, such as remove glasses and reveal ears, indicating how to succeed in authentication may further be provided on the authentication failure page.

During the face identification, a local feature analysis algorithm may be used and the computer image processing technology is integrated with the biometrics principle. Portrait feature points are extracted from the video uploaded by the terminal by using the computer image processing technology, a mathematical model is established by means of analysis by using the biometrics principle, then image features are extracted, so as to perform matching and identification between the extracted image features and prestored image features are performed, thereby implementing the face authentication.

In this embodiment, by means of video recording, face authentication is combined with a manner of implementing voice authentication by reading a verification code, so that both video recording and digital authentication requirements are achieved, thereby improving security of identity authentication. In a more preferred manner, preset personal information may further be uploaded for the authentication, such as identification card information or service password information, thereby further improving security. This is not specifically limited herein.

The identity authentication method provided in the embodiments of the present disclosure may be applicable to a remote upgrade account security system. When a user does not go to an entity counter for authentication, the user may implement personal identity verification by means of a face authentication process combining three functions face identification, voice identification, and identification card comparison, thereby upgrading a weak electronic account to a strong electronic account having a complete function. Verification code characters are highlighted one by one, so that the user is guided to read the highlighted verification code characters in a highlighted verification code character display rhythm, thereby preventing the user from reading all the verification code character at once. In addition, highlighting a single verification code character resolves a problem that a short-sighted user cannot see a character having a relatively small size after removing glasses.

It may be learned from the foregoing that, according to the identity authentication method provided in this embodiment, when an identity authentication request is received, a verification code is displayed in a first preset area, to instruct a user that voice identification needs to be performed. Verification code characters on which voice identification needs to be currently performed and that are in the verification code are highlighted one by one in a second preset area, so that it is convenient for the user read the highlighted verification code character, and finally, voice information is uploaded to a server, so that the server performs identity authentication on the user according to the voice information. In this embodiment of the present disclosure, voice authentication is added to an identity authentication process, and voice information on which authentication needs to be performed is collected by reading the verification code by the user, thereby avoiding risks of password leakage and stolen. In addition, during the voice information collection, the verification code characters on which voice identification needs to be currently performed are highlighted one by one in the preset area, so that it is more convenient for the user to distinguish. Compared with an existing manner of a user password and a static password, this embodiment greatly improves security and convenience of identity authentication.

Based on the above, in some embodiments, an identity authentication method is performed at an electronic device having one or more processors and memory, the electronic device coupled with a display and one or more input devices (e.g., one or more cameras, retina scanners, voice recorders, microphones, finger print sensors, touch-sensitive screen or touch-pads, keyboards, orientation sensors, etc.). The method includes receiving an identity authentication request. For example, a user initiates a process to upgrade a bank account, or initiating a payment process, or trying to access a right or privilege provided by the device, a facility, or an account (e.g., social network account, a media account, etc.). In some embodiments, the identity authentication request includes selection of a real-time bi-directional interactive authentication process. The real-time bidirectional authentication process aims to prevent pre-recorded voice inputs, facial images, retina images, videos, fingerprints, and gestures, being used to bypass a security measure, where the pre-ordered information is generated by non-authentic simulated means, or is stolen from the authorized users. The method includes: in response to receiving the identity authentication request, performing an interactive authentication information exchange between the electronic device and a user. The interactive aspect includes the device displaying some information to the user, and the user generate an input reading, writing, typing, or performing the information back to the device in real time. In some embodiments, the information provided by the device is in a first format (e.g., visual (e.g., graphic, or textual), or aural), and the input provided back to the device by the user is in a second format that is different from the first format (e.g., aural (e.g., speech, voice), action (e.g., gesture, movement), typed characters, etc.). The content of the user's input is generated in accordance with the information provided by the device. The method includes: displaying, on the display, first visual information in a first manner; displaying, on the display, the first visual information in a second manner that is distinct from the first manner, wherein the first visual information displayed in the second manner includes a timing characteristic that is absent from the first visual information displayed in the first manner. For example, the verification code is displayed as a sequence of characters in a string displayed at the top of the screen, and the verification code is also displayed one character at a time over a period of time, as the user reads the character out loud one by one. In some embodiments, a character matching requirement is also used by the device. For example, a secret mapping known to an authentic user is known to the device, and the user to be authenticated is supposed to use the displayed character as a key and read out a character corresponding to the displayed key based on the secrete mapping. In some embodiments, the characters can also be replaced with images, and the images have corresponding characters or phrases that should be provided by the user when seeing the images as the keys. The method includes: receiving user input entered in accordance with the first visual information displayed in the second manner. In some embodiments, the user input includes both speech input reading the verification code one by one as the characters of the verification code is displayed one by one at the center of the display with a visual enhancement relative to the other characters in the verification code. In some embodiments, the user input also includes video recording or streaming of the user's face or mouth reading the characters, or providing the speech input in accordance with the timing that the first visual information is displayed in the second manner. The device verifies that the user input conforms to the timing characteristic in the first visual information displayed in the second manner. For example, the device verifies that the user input includes segments of audio or sounds that corresponds to the timing that the characters of the code are displayed. In some embodiments, the device analyses the timing of mouth movement in the video to determine whether the input is provided in accordance with the timing of the first visual information being provided in the second manner.

In some embodiments, the method includes: in accordance with a determination that the user input conforms to the timing characteristic of the second visual information displayed in the second manner, uploading the user input to a server, so that the server performs identity authentication on the user according to the user input; and in accordance with a determination that the user input does not conform to the timing characteristic of the second visual information displayed in the second manner, prompting the user to resubmit the identity authentication request. In some embodiments, the user input is analysed in real-time for each segment of the input that is provided when each portion of the first visual information is displayed in the second manner, and in accordance with a determination that the current portion of the user input does not conform to the current portion of the first visual information that is displayed, the device optionally prompts the user to restart the user input. For example, while displaying a second character of the verification code, the device detects that the video recording that is captured at the same time shows the user talking continuously rather than reading the displayed character, or that the user is moving out of the predefined outline or frame boundary, the device interrupts the current interactive authentication session, and prompt the user to restart from the beginning again (e.g., be shown a new verification code, and read that new verification code aloud one character at a time).

In some embodiments, wherein the device displays the first visual information displayed in the first manner in a first region of the display, while the device displays the first visual information in the second manner in a second region of the display that is distinct from the first region of the display. For example, the sequence of characters in the verification code are displayed in small font in a row at the top of the screen, and the characters of the verification code are displayed one by one over a period of time at the center of the screen with an enlarged font. In some embodiments, instead of or in addition to the verification code, instructions are optionally displayed with enlarged font as well during a multistep verification process, so that the user can follow the instructions as well, without the aid of eye glasses.

In some embodiments, the method includes: displaying the first visual information in the first manner includes displaying a verification code that includes a sequence of characters as a whole without individually enhancing one character over another character of the verification code (e.g., in a row with same style); and displaying the first visual information in the second manner includes sequentially visually enhancing each character of the verification code relative to other characters of the verification code (e.g., displaying one character at a time with a large font, or highlighting or enlarging one character at a time while the other character remain displayed without highlight or at the original size). In some embodiments, the individual enhancement is performed in accordance with a predefined rhythm that is not uniform or monotonic, and the user has to generate the authentication information in accordance with the predefined rhythm in addition to providing the correct information (e.g., read the verification code correctly).

In some embodiments, verifying whether the user input conforms to the timing characteristic in the first visual information displayed in the second manner includes: analysing the user input to determine a plurality of parts of the user input that correspond to the sequence of characters; and determining whether a timing of each part of the plurality of parts of the user input corresponds to (e.g., is aligned with) a timing of a respective character of the sequence of characters being visually enhanced during display of the first visual information in the second manner.

In some embodiments, receiving the user input includes: recording a facial image of the user image while concurrently recording a speech input from the user, wherein the speech input includes a plurality of segments (e.g., respective speech segments for reading each of the characters in the verification code) that are arrange on a timeline at respective locations at which the plurality of characters of the sequence of characters in the verification code are displayed with visual enhancement.

In some embodiments, displaying the first visual information includes: displaying at least a first piece of information that is first authentication information for the user to confirm an identity of a sender of the first visual information, and displaying at least a second piece of information that is to be used as a basis for the user to generate second authentication information for the sender of the first visual information to verify an identity of the user. For example, after the user has started the process of interactive authentication, and removed the eye glasses, the user will not be able to see an authentication image or phrase that represents to the user that the user is standing in front of a legitimate terminal and using the correct banking website, as opposed to a fake terminal or banking site that is made to look like the real one. The authentication image or phrase is displayed with an enlarged size to the user, so that the user verify the image or phrase and enter a consent to proceed with the rest of the interactive authentication process.

In some embodiments, as part of the interactive authentication process, the device provides an instruction for the user to remove eye glasses, or other vision aid equipment on the face, in order to record a video in real time. The device records the video and analyses the video to determine whether a user has removed eye glasses or vision aid during the initial portion of the video recording. In response to detecting that the user has removed some form of vision aid, the device automatically deploys the process for displaying the first visual information in the manners described above. Otherwise, the device only displays the first visual information using the first manner (assuming that the user will be read it without enlargement while continue with the video recording). In some embodiments, the device continues to analyze the video to further adjust the amount of enhancement needed in order to help the user provide the authentication input without difficulty. For example, if the device detects that the user squints his/her eyes or moves/lean forward in an effort to read the characters, the device automatically increase the font sizes for subsequent characters. In addition, if the device detects that the user has made a reading mistake, the device prompts the reader to restart the recording with an even larger font size. In some embodiments, the device requires both the facial image and an image of a personal identification card to be captured, in addition to the voice input reading the verification code. In some embodiments, the information from the captured personal identification card is also enlarged in accordance with the determination that the eye glasses have been removed from the user's face.

In some embodiments, the method can be generalized to facial authentication in general, and prompt information is automatically enlarged when the device determines that the user does not have eye glasses on, and is likely in need of visual assistance. In some embodiments, the device uses this enhanced accessibility option for certain users known to wear contact lenses only during certain times of the day, or only when the user's behaviours in the currently captured video (e.g., squinting and leaning forward) indicates that vision aid is needed during the authentication process.

In some embodiments, instead of reading out loud the verification code, the device requests the user to write or trace out the characters on a touch-screen display. For example, when the enlarged character is displayed, the user is supposed trace out the character on a touch-sensitive surface or in the air with a gesture. In some embodiments, instead of a verification code consisting of characters, the verification code may be a pattern or symbol that needs to be reproduced by the user with a gesture or touch input.

In some embodiments, in response to detecting that the eye glasses are removed or that vision aid is needed, the device read out instructions to the use, and displays the verification code with enlarged fonts.

In some embodiments, the device analyse the user input as the input is received, and waits to display the next character in the sequence of characters until the voice input of the currently displayed character has been received. In some embodiments, the device prompts the user to restart or abandon the process if the input is not received within a threshold amount of time since the current character is displayed.

Other details of this method is provided with respect to other embodiments described herein, and can be combined with this features described above without limitation.

To better implement the identity authentication method provided in the embodiments of the present disclosure, an embodiment of the present disclosure further provides an apparatus based on the foregoing identity authentication method. Nouns have meanings the same as those in the foregoing identity authentication method, and for specific implementation details, refer to the description in the method embodiments.

Figure 3:
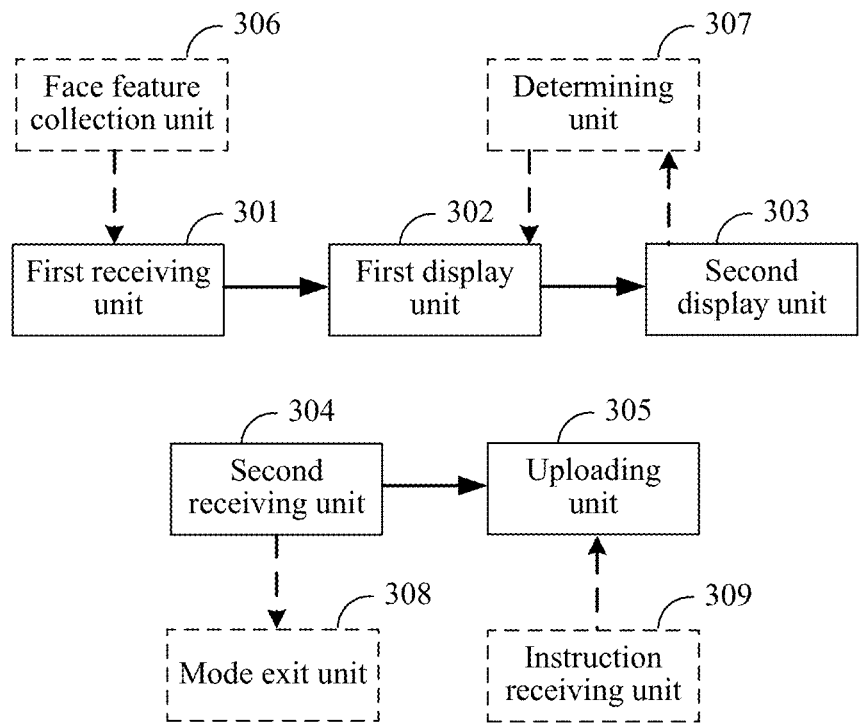
FIG. 3 is a schematic structural diagram of an identity authentication apparatus according to some embodiments of the present disclosure.

Referring to FIG. 3, FIG. 3 is a schematic structural diagram of an identity authentication apparatus according to some embodiments of the present disclosure. The identity authentication apparatus may include a first receiving unit 301, a first display unit 302, a second display unit 303, a second receiving unit 304, and an uploading unit 305.

The first receiving unit 301 is configured to receive an identity authentication request. The first display unit 302 is configured to: determine a first preset area and a second preset area on a display interface, and display a verification code in the first preset area according to the identity authentication request.

Preferably, the first display unit 302 may specifically include a prompt subunit, an obtaining subunit, and a first display subunit.

a: The prompt subunit is configured to output, according to the identity authentication request, an option that instructs to enter a voice identification mode.

b. The obtaining subunit is configured to: receive an operation performed by a user for the option, and after determining that the voice identification mode is entered, obtain the verification code from a server.

For example, a prompt key prompting the user to enter the voice identification mode is displayed on a screen of a terminal. If the user clicks the prompt key, it is determined that the voice identification mode is entered. The server randomly generates a verification code and delivers the verification code to the terminal. The verification code may be specifically digits, letters, a text, or the like, and is not specifically limited herein.

c: The first display subunit is configured to display the verification code in a first style in the first preset area, to indicate that the verification code is not yet read by the user (e.g., corresponding voice input not yet received or recorded).

For example, the first preset area may be an upper portion of the screen of the terminal. After the verification code delivered by the server is obtained, the verification code is displayed in the first style on the upper portion of the screen of the terminal. The first style may specifically limit a font size and/or a font color of the verification code. For example, gray processing is performed on the verification code, to indicate that the verification code is not yet read by the user (e.g., corresponding voice input not yet received or recorded).

More preferably, before the prompt subunit instructs, according to the identity authentication request, to enter the voice identification mode, the apparatus may further includes:

a face feature collection unit 306, configured to: output, according to the identity authentication request, prompt information indicating that a face authentication mode is entered; display a preset face authentication area in the face authentication mode, to prompt the user to align the face to the preset face authentication area; collect face features; and obtain a face feature collection result.

Specifically, for example, when an identity authentication request is received, a camera of the terminal is started, and a face authentication mode is directly entered. In the face authentication mode, a preset face authentication area is displayed, the preset face authentication area being used to prompt a user to align the face to the face authentication area, and face features are collected. In addition, a prompt key prompting the user to enter the voice identification mode is displayed on the screen of the terminal. If the user clicks the prompt key, the voice identification mode is entered, that is, a video is started to be recorded when the identity authentication request is received, so as to implement face feature collection and voice recording.

Subsequently, the second display unit 303 is configured to highlight, one by one in the second preset area, verification code characters on which voice identification needs to be currently performed and that are in the verification code.

For example, the second preset area may be the center of the screen of the terminal. After the voice identification mode is entered, the verification code characters on which voice identification needs to be currently performed and that are in the verification code are highlighted one by one at the center of the screen of the terminal. The highlighting may specifically limit a font size and/or a font color of the verification code character, so that the verification code character is highlighted and is convenient for the user to view.

It may be understood that there are multiple manners of highlighting one by one, the verification code characters on which voice identification needs to be currently performed and that are in the verification code. Preferably, the second display unit 303 may specifically include a determining subunit, an adjustment subunit, and a second display subunit.

1. The determining subunit is configured to determine, according to an arrangement order of verification code characters in the verification code, the verification code character on which voice identification needs to be currently performed.

For example, if the verification code is "54632", a verification code character on which voice identification needs to be currently performed is determined and highlighted in an order of "5→4→6→3→2".

2. The adjustment subunit is configured to adjust, according to a preset font style, the font style of the verification code character on which voice identification needs to be currently performed.

3. The second display subunit is configured to: display the adjusted verification code character in the second preset area within a preset time interval, and trigger highlight display of a next verification code character according to the arrangement order of the verification code characters.

For example, if the font size of the verification code displayed in the first preset area is four, the font size of the verification code character on which voice identification needs to be currently performed may be set to one, initial, or the like, that is, the original verification code character is enlarged, and the enlarged verification code character is displayed at the center of the screen within the preset time interval. For example, each verification code character is displayed at the center of the screen for 2 seconds or 3 seconds, so that the user can view the verification code character clearly and has enough time to read.

It may be understood that after a verification code character is enlarged displayed, enlarged display of a next verification code character is triggered according to the arrangement order of the verification code. For example, if the verification code is "54632", and after a verification code character "4" is enlarged displayed currently, enlarged display of a verification code character "6" is triggered in an order of "5→4→6→3→2" and is implemented according to the foregoing operation 2 and operation 3.

Further, after the second display subunit displays the adjusted verification code character in the second preset area within the preset time interval, the apparatus may further include:

a determining unit 307, configured to determine, in the verification code displayed in the first preset area, the highlighted verification code character, where the first display unit 302 is further configured to display, in a second style, the highlighted verification code character, to indicate that the verification code character is read.

That is, after the verification code character is enlarged displayed at the center of the screen, in the entire verification code displayed in the first preset area (for example, on the upper portion of the screen), the enlarged displayed verification code character is displayed in the second style. The second style may specifically limit a font size and/or a font color of the verification code. If the verification code is displayed in a default format, that is, displayed in a black color, it indicates that the verification code character is read, which is different from the gray-processed unread verification code character.

Subsequently, the second receiving unit 304 is configured to receive voice information entered by the user according to the highlighted verification code character; and the uploading unit 305 is configured to upload the voice information to the server, so that the server performs identity authentication on the user according to the voice information.

It may be understood that the second receiving unit 304 may be specifically configured to receive, when the adjusted verification code character is displayed in the second preset area within the preset time interval, the voice information sent by the user according to the verification code character.

For example, the verification code is "54632", if a verification code character "4" is enlarged displayed currently at the center of the screen, the user reads the current verification code character "4", and the voice information is received by means of a voice recording function. Then, a next verification code character "6" is enlarged displayed, the user reads the verification code character "6", and the voice information is received by means of the voice recording function. The rest can be deduced by analogy, and voice information entered by the user according to a current highlighted verification code character is received.

Preferably, after the voice information is received, before the uploading unit 305 uploads the voice information to the server, so that the server performs the identity authentication on the user according to the voice information, the apparatus may further include:

a mode exit unit 308, configured to exit the face authentication mode and the voice identification mode after determining that all the verification code characters are enlarged displayed; and an instruction receiving unit 309, configured to receive a selection instruction of the user, where the selection instruction instructs to upload a video recording result or record a video again for the video recording result, and the video recording result includes the received voice information and a face feature collection result.

That is, after all the verification code characters are enlarged displayed, a video recording mode may be exited, that is, the face authentication mode and the voice identification mode are exited. After the video recording mode is exited, the terminal prompts the user to upload the video recording result or record a video again for the video recording result. The user makes a selection according to the prompt, and the terminal makes a response according to the selection of the user. The video recording result may include the received voice information and the face feature collection result during the video recording.

Further, the uploading unit 305 is specifically configured to upload the video recording result to the server when determining that the selection instruction of the user instructs to upload the video recording result, so that the server performs the identity authentication on the user according to the video recording result.

In a more preferred manner, preset personal information may further be uploaded for the authentication, such as identification card information or service password information, thereby improving security. This is not specifically limited herein.

During specific implementation, each of the foregoing units may be implemented as an independent entity; or may be randomly combined, so as to be implemented as a same entity or several entities. For specific implementations of the foregoing units, refer to the foregoing method embodiments, and details are not described herein again.

The identity authentication apparatus may be specifically integrated into a terminal device such as a notebook computer or a tablet PC or a mobile phone.

It may be learned from the foregoing that, according to the identity authentication apparatus provided in this embodiment, when an identity authentication request is received, a verification code is displayed in a first preset area, to instruct a user that voice identification needs to be performed. Verification code characters on which voice identification needs to be currently performed and that are in the verification code are highlighted one by one in a second preset area, so that it is convenient for the user read the highlighted verification code character, and finally, voice information is uploaded to the server, so that the server performs identity authentication on the user according to the voice information. In this embodiment of the present disclosure, voice authentication is added to an identity authentication process, and voice information on which authentication needs to be performed is collected by reading the verification code by the user, thereby avoiding risks of password leakage and stolen. In addition, during the voice information collection, the verification code characters on which voice identification needs to be currently performed are highlighted one by one in the preset area, so that it is more convenient for the user to distinguish. Compared with an existing manner of a user password and a static password, this embodiment greatly improves security and convenience of identity authentication.

Figure 4:
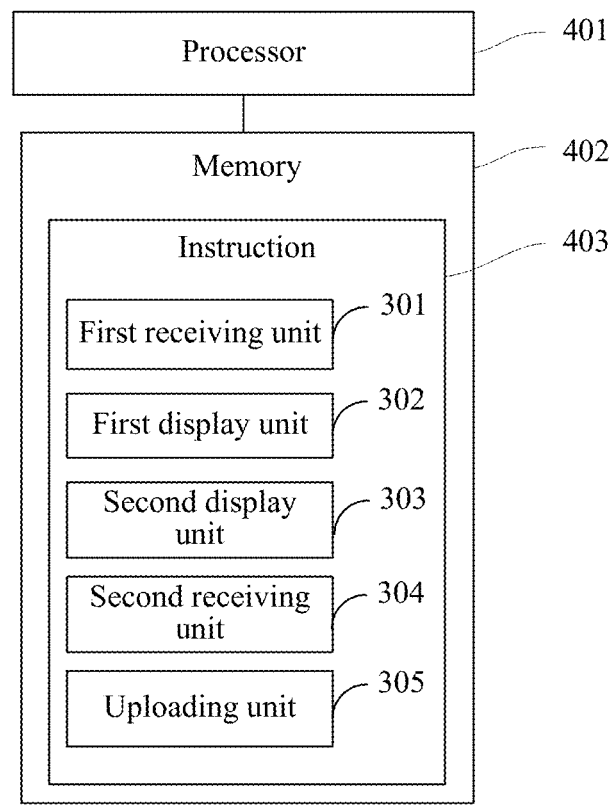
FIG. 4 is a schematic structural diagram of an identity authentication apparatus according to some embodiments of the present disclosure.

FIG. 4 is a schematic structural diagram of an identity authentication apparatus according to some embodiments of the present disclosure. As shown in FIG. 4, the identity authentication apparatus includes one or more processors 401, a memory 402, and one or more instruction units 403 that are stored in the memory 402 and executed by the one or more processors 401. The instruction unit 403 may include a first receiving unit 301, a first display unit 302, a second display unit 303, a second receiving unit 304, and an uploading unit 305. These virtual units include instructions used to implement their respective functions, so that when the processor 401 communicates with the memory 402, and reads and executes an instruction, the identity authentication apparatus may implement a corresponding function.

In the foregoing embodiments, the descriptions of the embodiments have respective focuses, for the part that is not described in detail in an embodiment, refer to the foregoing detailed description of the identity authentication method, and details are not described herein again.

The identity authentication apparatus provided in the embodiments of the present disclosure, for example, a computer, a tablet computer, a mobile phone having a touch function, and the identity authentication method in the foregoing embodiments are based on the same conception, and any method provided in the embodiments of the identity authentication method may be implemented on the identity authentication apparatus. For a specific implementation process, refer to the embodiments of the identity authentication method. Details are not described herein again.

It should be noted that, a person of ordinary skill in the art may understand that, all or some of the processes of the identity authentication method according to the embodiments of the present disclosure may be implemented by a computer program controlling relevant hardware. The computer program may be stored in a computer readable storage medium, for example, stored in a memory of a terminal, and executed by at least one processor in the terminal, where the execution process may include the processes of the embodiments of the identity authentication method. The foregoing storage medium may be a magnetic disk, an optical disc, a read-only memory (ROM), or a random access memory (RAM).

For the identity authentication apparatus in the embodiments of the present disclosure, the functional modules thereof may be integrated into one processing chip, or each of the modules may exist alone physically, or two or more modules may be integrated into one module. The integrated unit may be implemented in the form of hardware, or may be implemented in the form of a software functional unit. When the integrated module is implemented in the form of a software functional module and sold or used as an independent product, the integrated module may be stored in a computer readable storage medium. The storage medium may be, for example, a ROM, a magnetic disk, or an optical disc.

The identity authentication method and apparatus provided in the embodiments of the present disclosure are described above in detail. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. An identity authentication method, comprising:
   at an electronic device having one or more processors and memory, the electronic device coupled with a display and one or more input devices:
   receiving an identity authentication request;
   in response to receiving the identity authentication request, performing an interactive authentication information exchange between the electronic device and a user, including:
   displaying, on the display, first visual information in a first manner;
   displaying, on the display, the first visual information in a second manner that is distinct from the first manner, wherein the first visual information displayed in the second manner includes a timing characteristic that is absent from the first visual information displayed in the first manner;
   receiving user input entered in accordance with the first visual information displayed in the second manner;
   verifying that the user input conforms to the timing characteristic in the first visual information displayed in the second manner;
   in accordance with a determination that the user input conforms to the timing characteristic of the second visual information displayed in the second manner, uploading the user input to a server, so that the server performs identity authentication on the user according to the user input; and
   in accordance with a determination that the user input does not conform to the timing characteristic of the second visual information displayed in the second manner, prompting the user to resubmit the identity authentication request.

2. The method of claim 1, wherein the device displays the first visual information displayed in the first manner in a first region of the display, while the device displays the first visual information in the second manner in a second region of the display that is distinct from the first region of the display.

3. The method of claim 1, wherein:
   displaying the first visual information in the first manner includes displaying a verification code that includes a sequence of characters as a whole without individually enhancing one character over another character of the verification code; and displaying the first visual information in the second manner includes sequentially visually enhancing each character of the verification code relative to other characters of the verification code.

4. The method of claim 3, wherein verifying whether the user input conforms to the timing characteristic in the first visual information displayed in the second manner includes:

analysing the user input to determine a plurality of parts of the user input that correspond to the sequence of characters; and determining whether a timing of each part of the plurality of parts of the user input corresponds to a timing of a respective character of the sequence of characters being visually enhanced during display of the first visual information in the second manner.

5. The method of claim 3, wherein receiving the user input includes:

recording a facial image of the user image while concurrently recording a speech input from the user, wherein the speech input includes a plurality of segments that are arrange on a timeline at respective locations at which the plurality of characters of the sequence of characters in the verification code are displayed with visual enhancement.

6. The method of claim 1, wherein displaying the first visual information includes:

displaying at least a first piece of information that is first authentication information for the user to confirm an identity of a sender of the first visual information, and displaying at least a second piece of information that is to be used as a basis for the user to generate second authentication information for the sender of the first visual information to verify an identity of the user.

7. An electronic device, comprising:

one or more processors; and memory storing instructions, the instructions, when executed by the one or more processors, cause the processors to perform operations comprising:

receiving an identity authentication request;

in response to receiving the identity authentication request, performing an interactive authentication information exchange between the electronic device and a user, including:

displaying, on a display, first visual information in a first manner;

displaying, on the display, the first visual information in a second manner that is distinct from the first manner, wherein the first visual information displayed in the second manner includes a timing characteristic that is absent from the first visual information displayed in the first manner;

receiving user input entered in accordance with the first visual information displayed in the second manner;

verifying that the user input conforms to the timing characteristic in the first visual information displayed in the second manner;

in accordance with a determination that the user input conforms to the timing characteristic of the second visual information displayed in the second manner, uploading the user input to a server, so that the server performs identity authentication on the user according to the user input; and in accordance with a determination that the user input does not conform to the timing characteristic of the second visual information displayed in the second manner, prompting the user to resubmit the identity authentication request.

8. The electronic device of claim 7, wherein the device displays the first visual information displayed in the first manner in a first region of the display, while the device displays the first visual information in the second manner in a second region of the display that is distinct from the first region of the display.

9. The electronic device of claim 7, wherein:

displaying the first visual information in the first manner includes displaying a verification code that includes a sequence of characters as a whole without individually enhancing one character over another character of the verification code; and displaying the first visual information in the second manner includes sequentially visually enhancing each character of the verification code relative to other characters of the verification code.

10. The electronic device of claim 9, wherein verifying whether the user input conforms to the timing characteristic in the first visual information displayed in the second manner includes:

analysing the user input to determine a plurality of parts of the user input that correspond to the sequence of characters; and determining whether a timing of each part of the plurality of parts of the user input corresponds to a timing of a respective character of the sequence of characters being visually enhanced during display of the first visual information in the second manner.

11. The electronic device of claim 9, wherein receiving the user input includes:

recording a facial image of the user image while concurrently recording a speech input from the user, wherein the speech input includes a plurality of segments that are arrange on a timeline at respective locations at which the plurality of characters of the sequence of characters in the verification code are displayed with visual enhancement.

12. The electronic device of claim 7, wherein displaying the first visual information includes:

displaying at least a first piece of information that is first authentication information for the user to confirm an identity of a sender of the first visual information, and displaying at least a second piece of information that is to be used as a basis for the user to generate second authentication information for the sender of the first visual information to verify an identity of the user.

13. A non-transitory computer-readable storage medium storing instructions, the instructions, when executed by one or more processors, cause the processors to perform operations comprising:

receiving an identity authentication request;

in response to receiving the identity authentication request, performing an interactive authentication information exchange between the electronic device and a user, including:

displaying, on a display, first visual information in a first manner;

displaying, on the display, the first visual information in a second manner that is distinct from the first manner, wherein the first visual information displayed in the second manner includes a timing characteristic that is absent from the first visual information displayed in the first manner;

receiving user input entered in accordance with the first visual information displayed in the second manner;

verifying that the user input conforms to the timing characteristic in the first visual information displayed in the second manner;

in accordance with a determination that the user input conforms to the timing characteristic of the second visual information displayed in the second manner, uploading the user input to a server, so that the server performs identity authentication on the user according to the user input; and in accordance with a determination that the user input does not conform to the timing characteristic of the second visual information displayed in the second manner, prompting the user to resubmit the identity authentication request.

14. The computer-readable storage medium of claim 13, wherein the device displays the first visual information displayed in the first manner in a first region of the display, while the device displays the first visual information in the second manner in a second region of the display that is distinct from the first region of the display.

15. The computer-readable storage medium of claim 13, wherein:

displaying the first visual information in the first manner includes displaying a verification code that includes a sequence of characters as a whole without individually enhancing one character over another character of the verification code; and displaying the first visual information in the second manner includes sequentially visually enhancing each character of the verification code relative to other characters of the verification code.

16. The computer-readable storage medium of claim 15, wherein verifying whether the user input conforms to the timing characteristic in the first visual information displayed in the second manner includes:

analysing the user input to determine a plurality of parts of the user input that correspond to the sequence of characters; and determining whether a timing of each part of the plurality of parts of the user input corresponds to a timing of a respective character of the sequence of characters being visually enhanced during display of the first visual information in the second manner.

17. The computer-readable storage medium of claim 15, wherein receiving the user input includes:

recording a facial image of the user image while concurrently recording a speech input from the user, wherein the speech input includes a plurality of segments that are arrange on a timeline at respective locations at which the plurality of characters of the sequence of characters in the verification code are displayed with visual enhancement.

* * * * *